Figure 1:
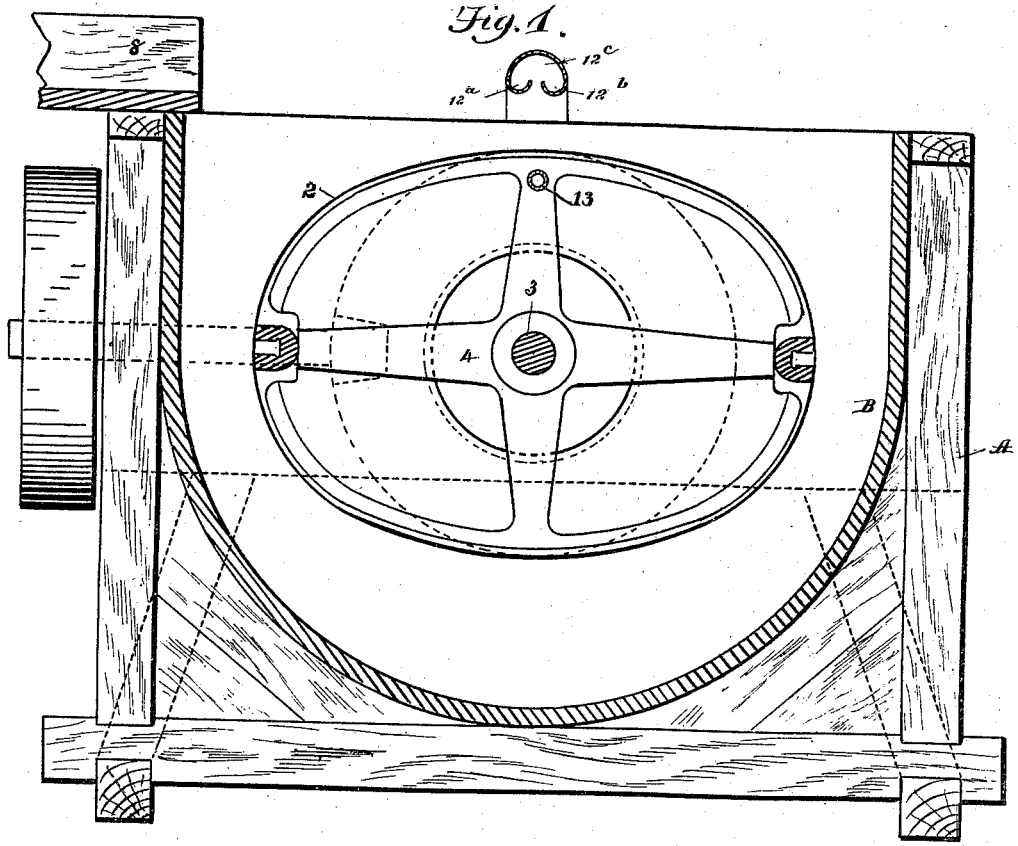

No. 612,424. Patented Oct. 18, 1898.
H. L. KUTTER.
REVOLVING SCREEN FOR PAPER PULP.
(Application filed Oct. 3, 1896.)

(No Model.) 3 Sheets—Sheet I.

WITNESSES. INVENTOR.
Herman L. Kutter
By Parker & Burton
Attorneys.

No. 612,424. Patented Oct. 18, 1898.
H. L. KUTTER.
REVOLVING SCREEN FOR PAPER PULP.
(Application filed Oct. 3, 1896.)
(No Model.) 3 Sheets—Sheet 2.
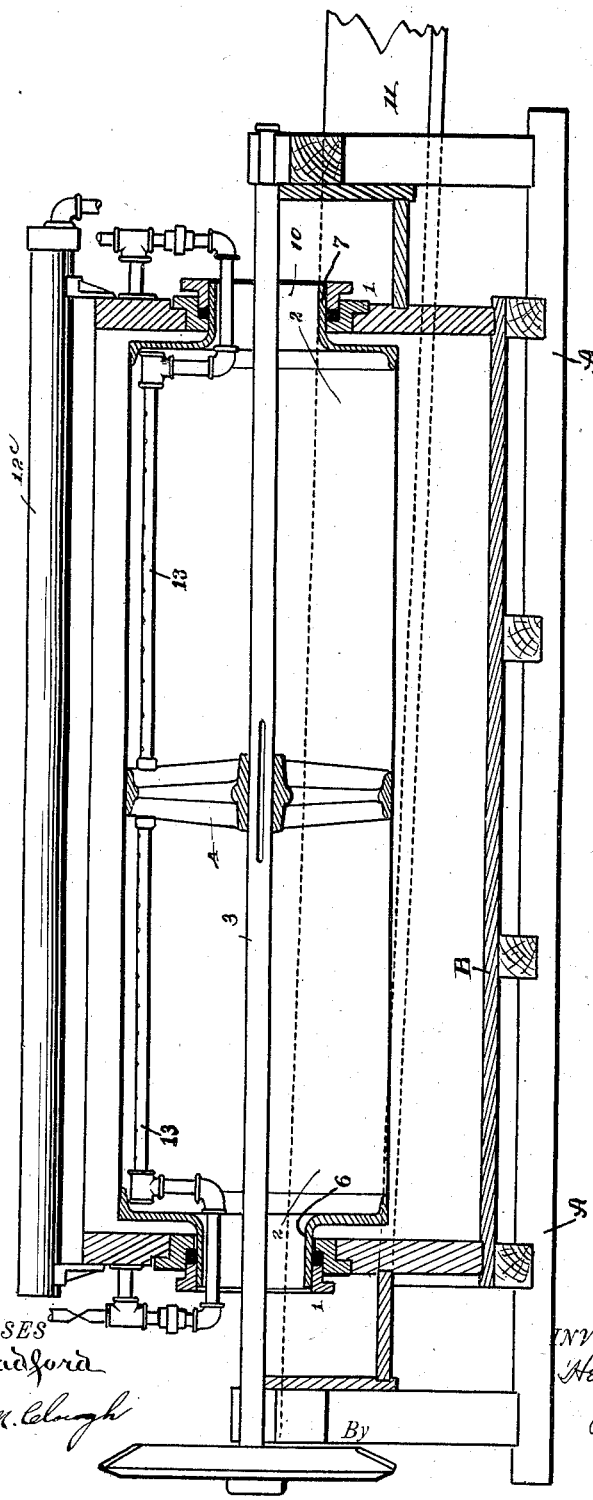

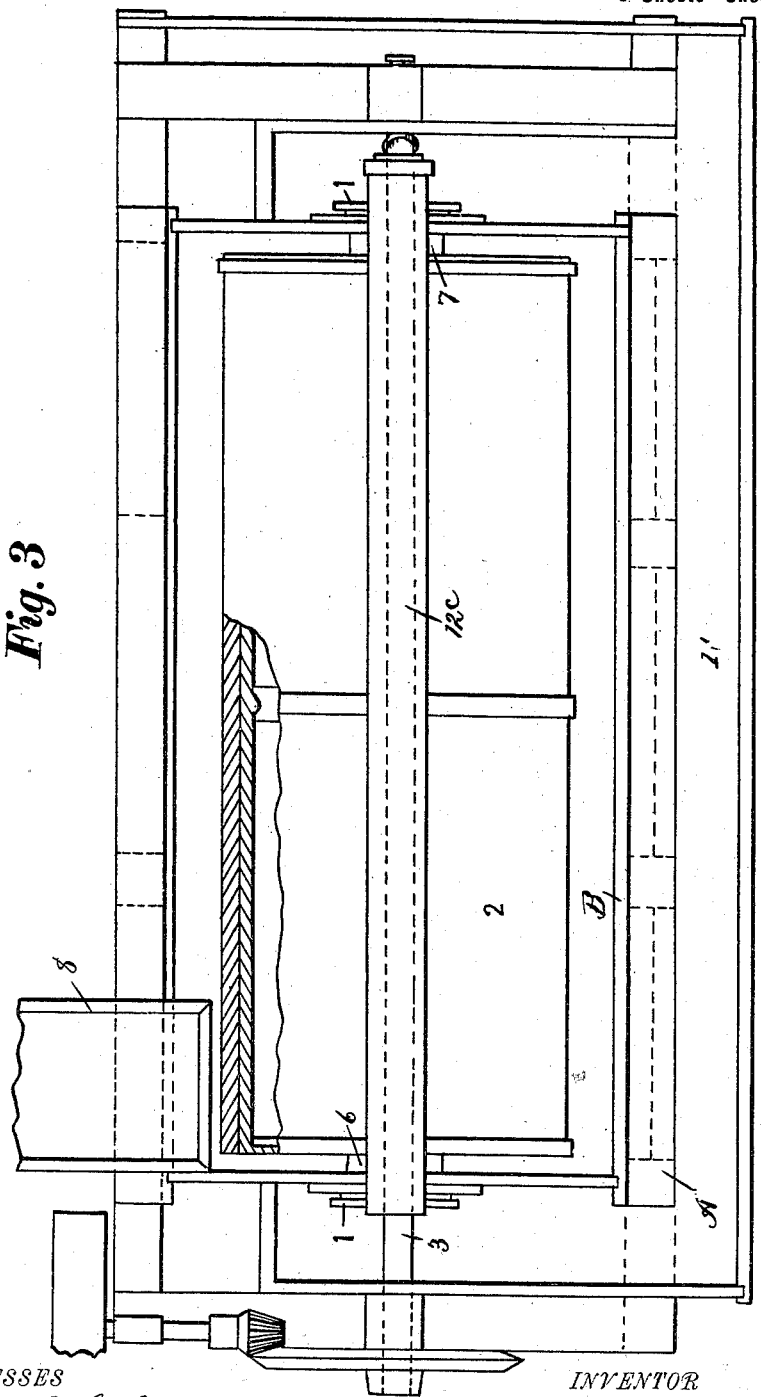

UNITED STATES PATENT OFFICE.

HERMAN L. KUTTER, OF SAULT STE. MARIE, CANADA.

REVOLVING SCREEN FOR PAPER-PULP.

SPECIFICATION forming part of Letters Patent No. 612,424, dated October 18, 1898.

Application filed October 3, 1896. Serial No. 607,761. (No model.)

*To all whom it may concern:*

Be it known that I, HERMAN L. KUTTER, a citizen of the United States, residing at Sault Ste. Marie, district of Algoma, Province of Ontario, Canada, have invented a certain new and useful Improvement in Revolving Screens for Paper-Pulp; and I declare the following to be a full, clear, and exact description of the invention, such as will enable others skilled in the art to which it pertains to make and use the same, reference being had to the accompanying drawings, which form a part of this specification.

This invention relates to pulp-straining machines, and has for its object an improved strainer adapted to keep the liquid in the vat in which the strainer is turning in a constant state of agitation, so that the liquid is constantly washing the sides of the strainer and washing away from it the material which with the ordinary cylindrical strainer gathers on the surface and fills up the holes, and thus prevents the free and proper action of the strainer.

In the ordinary cylindrical strainer used for separating or grading the paper material or suspended pulp the cylinder rotates smoothly, with very little or no disturbance of the liquid either on the inside or the outside of it. The straining is either from the outside to the inside or from the inside to the outside, some manufacturers straining in the one direction and some in the other; but in whichever direction the action may be the liquid on the feed side rises somewhat above the liquid on the outflow side owing to the frictional resistance that prevents the free passage of the liquid through the strainer, and there is consequently a steady pressure against the strainer; but in other respects the liquid is undisturbed, and long slivers of fiber which ought not to pass through the strainer are apt to be caught on some point on the surface, adhere to the cylinder, and be carried around, thus covering up part of the screening area and partially preventing the passage of the pulp through the strainer. There have been attempts made to overcome the difficulty, and among these attempts may be mentioned the use of the shaking apparatus, by which the screen itself or the liquid was given a shaking motion; but this apparatus easily gets out of repair and is expensive to maintain.

In the drawings, Figure 1 shows a vertical cross-section. Fig. 2 shows a vertical longitudinal section. Fig. 3 is a plan view, in which a part of the screen is shown as broken away.

A indicates the supporting-framework, within which is a semicylindrical vat B, provided at each end with bearings 1, in which are supported the necks or hollow journals 6 7 of the screen 2. This screen 2 is oval or elliptical in cross-section, as hereinafter described. As the screen revolves it presents first its long axis to the vertical and then its short axis, so that there is a constant change of position of the screen-wall with reference to the wall of the vat, and the rotation of the screen produces a rise and fall of the liquid on the outside of the screen, the amount of the rise and fall depending on the grade of the pulp, the quantity of pulp flowing into the vat, and whether the fibers give up the water freely or not. The more the screen is crowded the less variation there is in the level, as the liquid on the outside of the screen rises near to the top of the vat, while the liquid on the inside never reaches above the center of the shaft. As the liquid in the vat at one side of the screen rises it falls on the other side with a wave-like motion. The liquid on the inside remains nearly quiet. There is thus a constant stirring of the pulp material on the outside of the screen as it revolves, and this tends constantly to wash away from the screen any adhering slivers that would otherwise attach themselves to it and stop up the perforations. Moreover, the pulsations press the fiber through the strainer with a force additional to the mere difference in levels.

4 indicates the central spider by which the shaft 3 is attached to the barrel of the screen. This relieves the stuffing-boxes of the largest part of the weight of the strainer and combines the advantage of a through-shaft with open strainer ends and allows the placing of a shower-pipe at the inside of the strainer.

6 and 7 indicate the end supports of the screen, and they rest in suitable stuffing-boxes 1. These end supports are hollow journals without spiders and afford a passage-way for the pulp.

When the strainer is in action, the pulp passes from the feed-tank through the feed-spout 8 into the vat on the outside of the screen, is strained through to the inside of the screen, and delivered from the inside through the hollow journals 6 7 into the outflow-trough 11.

The end bearings for the shaft 3 are entirely outside of and disconnected from the vat and are above the normal level of the liquid in the vat.

Into each end of the screen, through the hollow journal at the end, is inserted a spray-pipe 13. There are two of these spray-pipes, one leading into each end and reaching to the central spider 4. Each pipe is provided along its upper side with spray-holes, through which jets of water are thrown against the inside of the screen, and some part of this water rises through the screen, washing off any slivers that may have been carried up as the screen rose out of the water, and a large part of this spray-water is caught in the trough 12. This trough 12 is formed double, with a covering that reaches from the outside of one to the outside of the other, and covers the space over the two parts of the spray-pipe and the space between them. The spray-water rising between the two troughs $12^a$ $12^b$ strikes the curved covering $12^c$, and the larger part of it is deflected into the troughs $12^a$ $12^b$ and carried away.

What I claim is—

1. In combination with a vat and means for feeding thereinto paper-pulp suspended in liquid, an oval or elliptical screen adapted to rotate therein hollow journals supporting said screen at its ends, a shaft traversing said hollow journals and itself supported in bearings above the normal level of liquid in the vat and screen, substantially as described.

2. In combination with a vat, an oval or elliptical screen provided with hollow journal end supports, a middle support, a shaft keyed to the middle support and passing through the hollow journal end supports without engaging them, substantially as described.

3. In combination with a vat and means for feeding thereinto pulp suspended in liquid, a screen of which a cross-section has one major and one minor axis and which is provided with hollow journal end supports, and a middle support, a shaft keyed to the middle support, passing through the hollow journal end supports without engaging them, and spray-pipes entering the interior of the screen through the journal and extending to the middle support, substantially as described.

4. In combination with a vat and means for feeding thereinto paper-pulp suspended in liquid, a screen journaled to rotate within the vat and having substantially the form in cross-section of an ellipse with one major and one minor axis, substantially as described.

In testimony whereof I sign this specification in the presence of two witnesses.

HERMAN L. KUTTER.

Witnesses:
EDWARD ALAN SULLIVAN,
JOHN A. WILDE.